(12) United States Patent
Pomerantz (10) Patent No.: US 8,776,238 B2
(45) Date of Patent: Jul. 8, 2014

(54) VERIFYING CERTIFICATE USE

(75) Inventor: Ori Pomerantz, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 931 days.

(21) Appl. No.: 12/173,946

(22) Filed: Jul. 16, 2008

(65) Prior Publication Data

US 2010/0017848 A1      Jan. 21, 2010

(51) Int. Cl.
 *G06F 11/26*      (2006.01)
(52) U.S. Cl.
 USPC .................................... 726/25; 713/156
(58) Field of Classification Search
 USPC .............. 726/2–12, 21, 26, 25, 28, 29, 14; 713/150, 156, 153; 380/255
 See application file for complete search history.

(56) References Cited

U.S. PATENT DOCUMENTS

| | | | | |
|---|---|---|---|---|
| 5,774,552 | A * | 6/1998 | Grimmer | 713/156 |
| 6,148,400 | A * | 11/2000 | Arnold | 713/168 |
| 6,421,781 | B1 * | 7/2002 | Fox et al. | 726/4 |
| 6,636,585 | B2 * | 10/2003 | Salzberg et al. | 379/22 |
| 7,017,046 | B2 * | 3/2006 | Doyle et al. | 713/178 |
| 7,043,453 | B2 * | 5/2006 | Stefik et al. | 705/52 |
| 7,127,646 | B1 | 10/2006 | Day | 714/703 |
| 7,134,024 | B1 * | 11/2006 | Binding et al. | 713/187 |
| 7,171,558 | B1 * | 1/2007 | Mourad et al. | 713/168 |
| 7,216,226 | B2 * | 5/2007 | Ndiaye | 713/155 |
| 7,228,461 | B2 * | 6/2007 | Krietemeyer et al. | 714/45 |
| 7,395,430 | B2 * | 7/2008 | Gupta | 713/175 |
| 7,415,620 | B2 * | 8/2008 | England et al. | 713/193 |
| 7,562,218 | B2 * | 7/2009 | Kirkup et al. | 713/168 |
| 7,840,993 | B2 * | 11/2010 | Ganesan et al. | 726/7 |
| 8,161,496 | B2 * | 4/2012 | Paliswiat et al. | 719/318 |
| 2002/0188870 | A1 * | 12/2002 | Gong et al. | 713/201 |
| 2003/0145120 | A1 * | 7/2003 | Vasko et al. | 709/249 |
| 2003/0149889 | A1 * | 8/2003 | Wookey et al. | 713/200 |
| 2003/0196085 | A1 * | 10/2003 | Lampson et al. | 713/156 |

(Continued)

FOREIGN PATENT DOCUMENTS

WO      2005060202 A1      6/2005

OTHER PUBLICATIONS

Microsoft, "How to Set Up Test Certificates for SSL/TLS Application Development" [Online], Nov. 21, 2006 [Retrieved on Feb. 28, 2013], [Retrieved from: http://support.microsoft.com/kb/288897 ].*

(Continued)

*Primary Examiner* — Saleh Najjar
*Assistant Examiner* — Eric W Shepperd
(74) *Attorney, Agent, or Firm* — Garg Law Firm, PLLC; Rakesh Garg; Jeffrey S. LaBaw (57) ABSTRACT

A method, system, and computer usable program product for verifying certificate use are provided in the illustrative embodiments. A secure data communication is directed to a certificate use verification application. A test certificate that may be stored in a data storage associated with a data processing system is presented to an originator of the secure data communication. The test certificate includes an identity, and the identity identifies an entity other than the intended party to the secure data communication as being the holder of the test certificate. A determination is made whether the originator responds to continue the secure data communication when presented with the test certificate. If the originator responds to continue the secure data communication, a report is made that the originator does not perform a verification of the identity from the test certificate.

21 Claims, 5 Drawing Sheets

(56) References Cited

U.S. PATENT DOCUMENTS

| | | | |
|---|---|---|---|
| 2004/0093493 A1* | 5/2004 | Bisbee et al. | 713/156 |
| 2004/0181818 A1* | 9/2004 | Heyner et al. | 725/146 |
| 2005/0069136 A1* | 3/2005 | Thornton et al. | 380/277 |
| 2005/0172128 A1 | 8/2005 | Little et al. | |
| 2005/0223219 A1* | 10/2005 | Gatto et al. | 713/156 |
| 2005/0262345 A1 | 11/2005 | Moreau | |
| 2006/0090206 A1* | 4/2006 | Ladner et al. | 726/25 |
| 2006/0143700 A1* | 6/2006 | Herrmann | 726/14 |
| 2006/0224742 A1* | 10/2006 | Shahbazi | 709/226 |
| 2008/0104575 A1* | 5/2008 | Fan et al. | 717/124 |
| 2008/0126794 A1* | 5/2008 | Wang et al. | 713/151 |
| 2008/0195866 A1* | 8/2008 | Roth et al. | 713/171 |
| 2008/0300814 A1* | 12/2008 | Drummond et al. | 702/108 |
| 2009/0113540 A1* | 4/2009 | Chandwani | 726/13 |
| 2009/0323954 A1* | 12/2009 | Sprunk et al. | 380/259 |

OTHER PUBLICATIONS

"PATROL® 7 Security Implementation: Securing the Data in Your PATROL-Managed Environment," BMC Software, Inc., Feb. 2002, http://documents.bmc.com/products/documents/34/09/13409/13409.pdf.

Huang "SSL and SSL Proxy Support for SOAP/XML Web Sevices,"Masters project, Department of Computer Science, The Florida State University, Nov. 11, 2002, www.cs.fsu.edu/~engelen/HuangMasters.doc.

* cited by examiner

*FIG. 7D*

VERIFYING CERTIFICATE USE

BACKGROUND OF THE INVENTION

1. Field of the Invention

The present invention relates generally to an improved data processing system, and in particular, to a computer implemented method for determining the security of interactions between data processing systems. Still more particularly, the present invention relates to a computer implemented method, system, and computer usable program code for verifying certificate use by an application in a data processing system.

2. Description of the Related Art

Applications executing on different data processing systems communicate with each other over data networks. Some of these data communications may have to include certain security mechanisms, such as encryption, to ensure that the data contained in the communication is not intercepted or manipulated. Encryption is the process of converting data from one form to another form, called cipher text, in such a way that it is difficult for someone to derive the original data from the cipher text without knowing the method and tools used for the encryption.

In some other data communications, the security mechanism may prevent repudiation of the communication by one or both parties, such as by using digital signatures. A digital signature is a method of authenticating the holder of the digital signature in a manner analogous to a handwritten signature. A digital signature may include a pair of strings of characters, which when processed through well known algorithms provide authenticating information about the holder of that digital signature.

In some data communications, the security mechanism is designed to ensure the identity of the data processing systems on each end of the data communication, and encrypting the data communication between the two communicating systems. Digital certificates are commonly used for these purposes in data communications. A digital certificate, or simply a certificate, includes strings of characters, such that the strings correspond to each other when processed through certain algorithms. Digital certificates can also be used for digital signature purposes. Usually, a certificate is "signed" by a trusted third party, such as the issuer of the certificate called a certificate authority (CA), who can attest to the identity of the holder of the certificate to some degree.

A well known technique for verification and encryption is called public key cryptography. A certificate used in public key cryptography uses two strings of characters known as keys—a public key and a private key. The public key can be distributed to anyone and can be used to encrypt data such that the encrypted data can be decrypted only by using a private key that corresponds to the public key in conjunction with an algorithm called the cipher. Similarly, the holder of a certificate can sign a message using the private key. Anyone with the corresponding public key can verify the signature, such as from the certificate authority.

Certificates can be assigned to software applications as well as data processing systems. Software applications and data processing systems can use the certificates for authentication, encryption, non-repudiation, and other uses. One use of certificates is in secure sockets layer (SSL) communication. SSL communication is a secure method of communicating private information over public networks, such as over the Internet. In SSL communication, one system, called the client, requests a secure communication with another system, called the server. The client and the server negotiate a cipher to use for the communication. The server presents its certificate, which authenticates the server and provides the server's public key to the client. The client generates a random number to be used as a key for the secure communication session. The random number is called the session key. The client encrypts the session key using the server's public key from the server's certificate and sends to the server. The server decrypts the encrypted session key using its private key and obtains the session key to use in the secure communication session with the client.

SUMMARY OF THE INVENTION

The illustrative embodiments provide a method, system, and computer usable program product for verifying certificate use. A secure data communication is directed to a certificate use verification application. A test certificate that may be stored in a data storage associated with a data processing system is presented to an originator of the secure data communication. The test certificate includes an identity, and the identity identifies an entity other than a party to the secure data communication as being the holder of the test certificate. A determination is made whether the originator responds to continue the secure data communication when presented with the test certificate. If the originator responds to continue the secure data communication, a report is made that the originator does not perform a verification of the identity from the test certificate.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

When an application receives a server certificate in response to a request for an SSL communication, the application can perform several steps to verify that the server is actually the server with which the application intends to establish secure data communication. One such step is for the application to ensure that the certificate is a valid certificate. The application can perform this step by processing the certificate against a root certificate of the certificate authority who signed the certificate. A root certificate is a certificate of a certificate authority, which can be stored in a certificate repository of the application and can be used for verifying that the certificate authority trusts the holder of the certificate, such as a server of a server certificate being presented.

Illustrative embodiments recognize that some applications use certificates in a manner that may allow a breach of security of the data communication. For example, an application may receive a certificate, such as a server certificate from a server. The application only verifies that a valid certificate authority issued the certificate. The application may also verify that the certificate has not expired or has not been revoked. Following these verifications, the application may proceed to establish the requested SSL communication.

The illustrative embodiments recognize that applications employing this verification procedure may permit an "SSL masquerading" breach of security. SSL masquerading is the process by which an imposter server may pretend to be another genuine server and receive SSL communications that an application may wish to establish with the genuine server. The following example illustrates one way in which SSL masquerading may occur. An imposter registers a domain "imposter.com". The imposter receives a server certificate from a well known certificate authority for "imposter.com" because the imposter is the legitimate owner of imposter.com domain. The imposter configures an imposter directory server, "ldap.imposter.com", that can support SSL communication using the imposter.com certificate and hosts it at an internet protocol (IP) address 102.107.1.1. A legitimate directory server may exist in association with a separate legitimate domain, for example, "ldap.legitimate.com" at IP address 207.102.67.34.

The imposter then infiltrates a domain name service (DNS) such that ldap.legitimate.com resolves to 102.107.1.1 and the traffic directed to ldap.legitimate.com is directed to "ldap.imposter.com" at 102.107.1.1. Resolving one domain to another, routing traffic for one IP address to another IP address, and other ways of hijacking the data traffic can be accomplished by any of the several known ways. DNS cache poisoning and attacking the routing protocol are examples of the ways by which an imposter may be able to accomplish these objectives.

Continuing with the example, the SSL masquerading transpires when an application, such as a directory client application or a browser requests an SSL communication with ldap.legitimate.com. The application's request is routed to ldap.imposter.com and the directory at ldap.imposter.com presents the certificate issued to imposter.com to the application. If the application only verifies that the certificate is valid, unexpired, and issued by a known certificate authority, the imposter.com certificate will pass as a valid, unexpired certificate that is legitimately issued by a well known certificate authority.

The illustrative embodiments recognize that if the application fails to further verify whether the certificate is issued to legitimate.com, with which the application seeks SSL communication, the application may accept the certificate and establish the SSL communication with ldap.imposter.com. Thus, ldap.imposter.com may successfully masquerade as ldap.legitimate.com and receive SSL communications from the application that was meant for ldap.legitimate.com in this example. Similar to this example, and with certain known modifications, an imposter application can masquerade as another legitimate application and receive SSL traffic in an unauthorized manner.

The breach of security caused by SSL masquerading in this manner is undesirable. The illustrative embodiments recognize that often, users may not be aware than an application in their data processing environment may not be verifying certificates adequately and causing an SSL masquerading vulnerability in the data processing environment. The illustrative embodiments further recognize that the users may or may not be able to correct an application's handling of certificates in order to correct this vulnerability.

To address these and other problems related to certificate verification and SSL masquerading, the illustrative embodiments provide a method, system, and computer usable program product for verifying certificate use by an application in a data processing system. The illustrative embodiments may be used in conjunction with any application or any data processing system that may use certificates, including but not limited to SSL communication.

For example, the illustrative embodiments may be implemented with a directory server, a name server, a user location service server (ULS server), an application server, a web server, a proxy server, a mail server, a feed server, or any other type of data server. The illustrative embodiments may also be implemented with any business application, enterprise software, and middleware applications or platforms. Additionally, the illustrative embodiments may be implemented in conjunction with a hardware component, such as in a firmware, as embedded software in a hardware device, or in any other suitable hardware or software form.

Any advantages listed herein are only exemplary and are not intended to be limiting on the illustrative embodiments. Additional advantages may be realized by specific illustrative embodiments. Furthermore, a particular illustrative embodiment may have some, all, or none of the advantages listed above.

Figure 1:
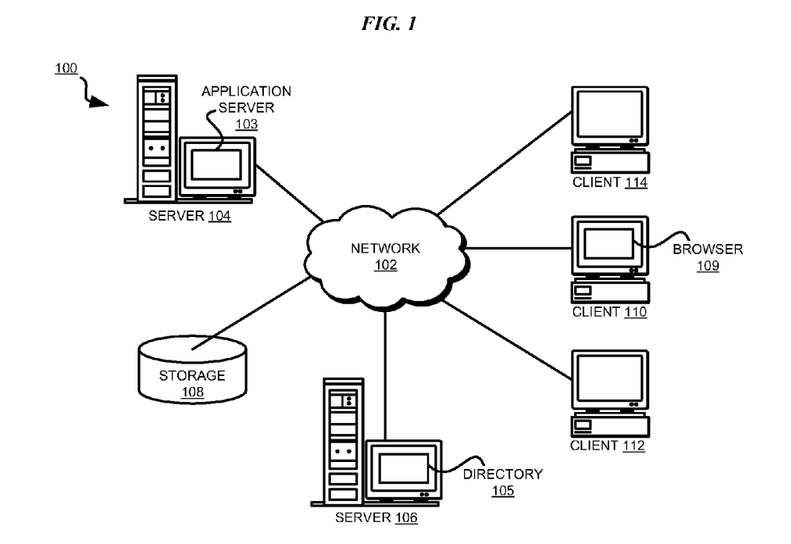
FIG. 1 depicts a pictorial representation of a network of data processing systems in which illustrative embodiments may be implemented.
Figure 2:
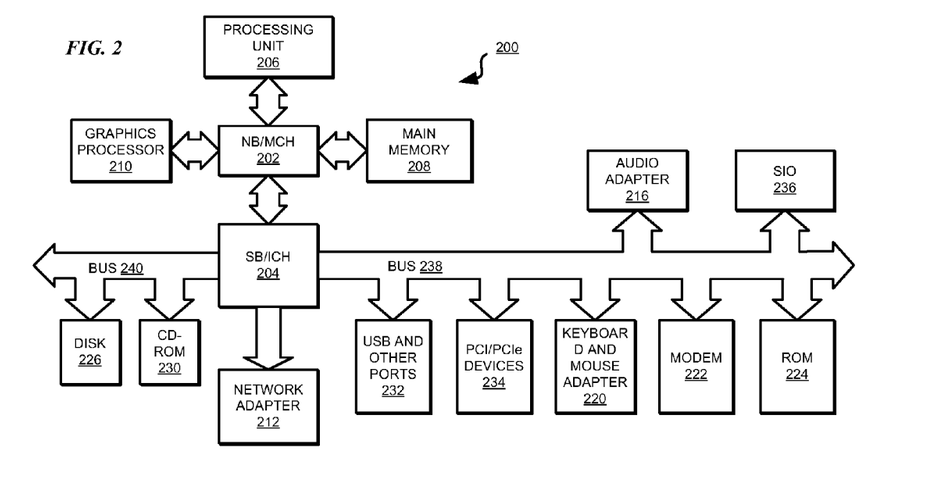
FIG. 2 depicts a block diagram of a data processing system in which illustrative embodiments may be implemented.

With reference to the figures and in particular with reference to FIGS. 1 and 2, these figures are exemplary diagrams of data processing environments in which illustrative embodiments may be implemented. FIGS. 1 and 2 are only exemplary and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Software applications may execute on any computer in data processing environment 100. Server 104 and server 106 couple to network 102 along with storage unit 108. In the depicted example, server 104 includes application server 103 and server 106 includes directory 105, which may be an exemplary software application, in conjunction with which the illustrative embodiments may be implemented. In addition, clients 110, 112, and 114 couple to network 102. Any of clients 110, 112, and 114 may have an application, typically a client application, executing thereon. As an example, client 110 is depicted to have browser 109 executing thereon. Browser 109 may be a commonly used web-browser. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
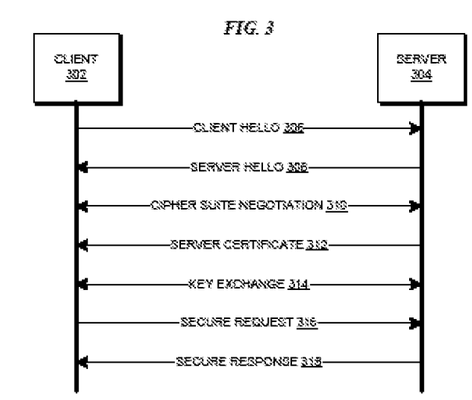
FIG. 3 depicts a block diagram of an SSL communication process in which the illustrative embodiment may be implemented.

With reference to FIG. 3, this figure depicts a block diagram of an SSL communication process in which the illustrative embodiment may be implemented. Client 302 may be a client data processing system, such as any of clients 110, 112, and 114 in FIG. 1. Client 302 may also a client application, such as browser 109 in FIG. 1 or an application executing under application server 103 in FIG. 1. Client 302 is capable of secure data communication using SSL. Client 302 may be an originator of the SSL communication. An originator originates or initiates an SSL communication, such as by sending a request to another data processing system or application to begin an SSL Communication with the other data processing system or application.

Server 304 may be a server data processing system, such as any of server 104 and 106 in FIG. 1, or a server application, such as application server 103 or directory 105 103 in FIG. 1. Server 304 is capable of secure data communication using SSL.

For initiating an SSL communication, client 302 and server 304 engage in a handshake process. The handshake begins with client 302 sending request 306 for SSL communication that is analogous to saying "hello" to server 304. Server 304 responds with an acknowledgement 308, which is analogous to responding to client 302's hello. As a part of the handshake, client 302 and server 304 negotiate 310 a cipher suite that they will use for the SSL communication. A cipher suite is a set of process, algorithms, and data that is used for encrypting and decrypting the data that is to be securely communicated using SSL.

Client 302 and server 304 identify a cipher suite that is acceptable to both. Generally, the strongest cipher that both parties can support is selected as the cipher suite to be used for the SSL communication.

Server 304 presents its server certificate 312 to client 302. Client 302 generates a random number that client 302 wants to use as a session key and encrypts the session key using the public key from the server certificate received in interaction 312. Key exchange 314 delivers the encrypted key to server 304. Server 304 decrypts the session key using the private key corresponding to the server certificate of interaction 312. Key exchange 314 may include acknowledgements or communication of alternate session keys and any other implementation specific steps.

Once client 302 and server 304 agree on a session key and the session key is securely exchanged between client 302 and server 304 in the manner described above, client 302 and server 304 can engage in secure data communication over SSL. For example, client 302 may send request 316 that is secured by encrypting with the session key. Server 304 may send response 318 that is also secured by encrypting with the session key.

Client 302 may verify only that the server certificate received in interaction 312 is valid and unexpired as described in the SSL masquerading problem recognized by the illustrative embodiments above. Client 302 may wish to interact with a particular server as server 304, but any server may masquerade as server 304, send a legitimate but wrong server certificate that client 302 can validate, and begin SSL communication with client 302.

Note that SSL masquerading can occur with other types of certificates as well, not only server certificate. Server certificate, also known as a class 3 certificate, and a client-server configuration are used in the description of the illustrative embodiments only for clarity and are not limiting on the illustrative embodiments. For example, an application may present a class 1, class 2, class 4, or class 5 certificate, and another application may simply verify that the certificate is valid and unexpired, but fail to verify that the holder of the certificate is an entity with whom the latter application wishes to establish SSL communication.

Figure 4:
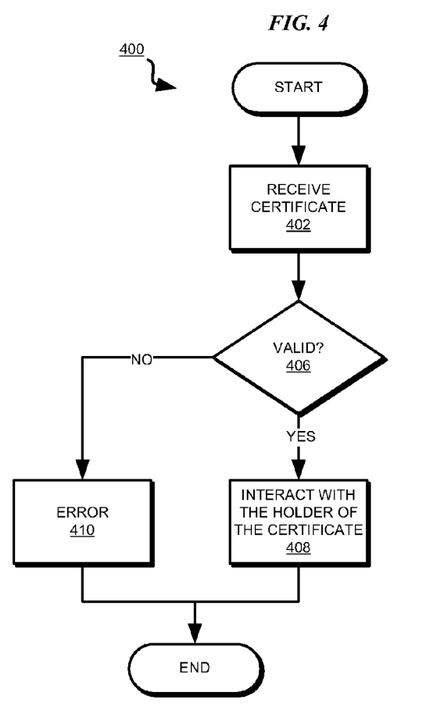
FIG. 4 depicts a flowchart of a process that an application may implement in order to avoid the SSL masquerading problem identified by the illustrative embodiments.

With reference to FIG. 4, this figure depicts a flowchart of a process that an application may implement in order to avoid the SSL masquerading problem identified by the illustrative embodiments. Process 400 may be implemented in an application, such as client 302 in FIG. 3, which may be an application of a data processing system.

Process 400 begins by receiving a certificate (step 402). Process 400 determines whether the certificate is valid by determining if the certificate is issued by a valid certificate authority, has not expired, and is held by a desired entity (step 406). A particular implementation may implement any of these tests, additional tests, other substitute tests for similar purposes, in any combination for step 406 without departing from the scope of the illustrative embodiments.

If process 400 determines that the certificate is valid in all respects ("Yes" path of step 406), process 400 interacts with the holder of the certificate (step 408). Otherwise, ("No" path of step 406), process 400 reports an error (step 410). Process 400 ends thereafter.

Many applications fail to test as a part of step 406 that the certificate is held by an entity with which they wish to interact. The illustrative embodiments provide a process for determining if an application is not performing this test.

Figure 5:
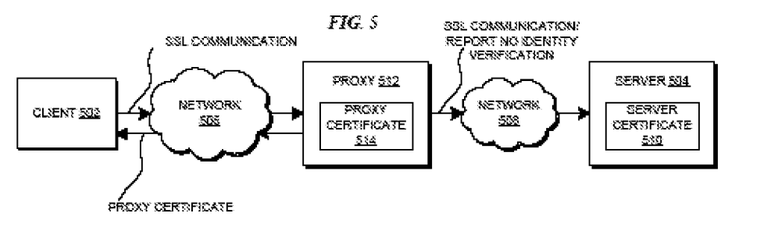
FIG. 5 depicts a block diagram of a certificate validation configuration in accordance with an illustrative embodiment.

With reference to FIG. 5, this figure depicts a block diagram of a certificate validation configuration in accordance with an illustrative embodiment. Client 502 may be implemented using client 302 in FIG. 3. Server 504 may be implemented using server 304 in FIG. 3. Each of network 506 and network 508 may be analogous to network 102 in FIG. 1.

Server 504 uses server certificate 510 in SSL communication with client 502, which occurs via proxy 512 in accordance with an illustrative embodiment. Proxy 512 is a certificate use verifying proxy server, which may be implemented using a commonly used proxy server in conjunction with a certificate use verification application implementing the certificate use verification function of the illustrative embodiment. As a certificate use verifying proxy, proxy 512 helps determine if client 502 is validating server certificate 510 for the identity of server 504. This function is the certificate use verification function. Proxy 512 may be included in a data processing environment, such as in network 508, such that data communication directed to server 504 are redirected to proxy 512. The redirection may be accomplished by using commonly available tools for managing and routing data traffic in a data network. Such a tool may be included in, or be separate from the certificate use verification application.

Proxy 512 uses proxy certificate 514 in the certificate use verification function. Certificate 514 may be stored in a data storage device, such as a hard disk, random access memory, or other type of data storage, associated with a data processing system on which proxy 512 executes. When client 502 requests SSL communication with server 504, proxy 512 detects the initiation of the SSL communication and presents proxy certificate 514 to client 502 instead of server certificate 510. Proxy certificate 514 may be a certificate that is valid as far as it is issued by a valid certificate authority to a valid entity. However, proxy certificate 514 may be issued to an entity different from server 504 or an entity corresponding to server 504.

Proxy 512 then determines if client 502 responds to proxy 512's sending of proxy certificate 514 with a response expected in the SSL communication, such as by sending an encrypted session key. If client 502 responds in an expected manner, proxy 512 determines that client 502 is not performing a validation of the identity of server 504 with which client 502 had initiated SSL communication.

Figure 6:
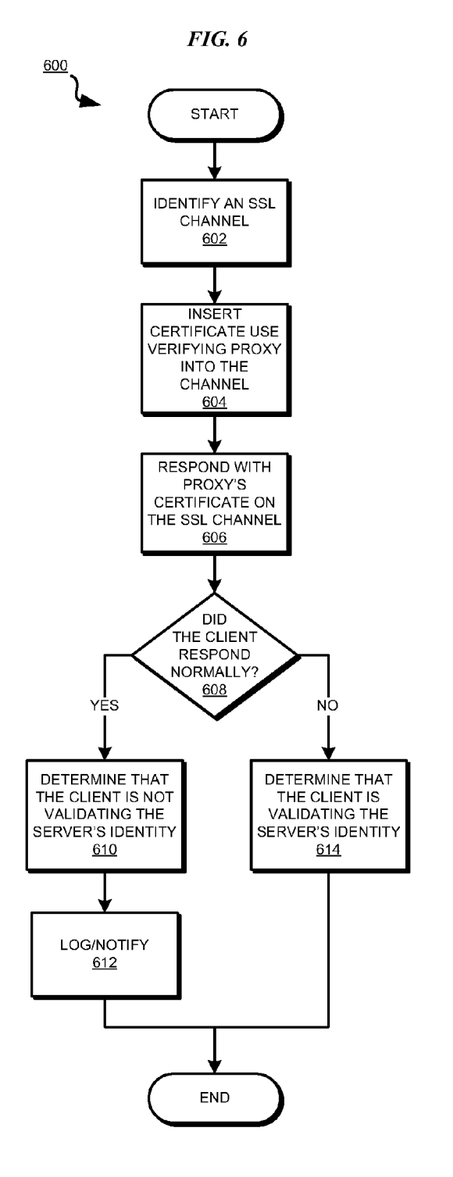
FIG. 6 depicts a flowchart of a process of certificate use verification in accordance with an illustrative embodiment.

With reference to FIG. 6, this figure depicts a flowchart of a process of certificate use verification in accordance with an illustrative embodiment. Process 600 may be implemented in a certificate use verifying proxy, such as proxy 512 in FIG. 5.

Process 600 begins by determining an SSL channel in use (step 602). An SSL channel is a data communication pathway over which an SSL communication occurs. In one embodiment, step 602 may be accomplished by using a sniffer. A sniffer is a hardware, software, or a combination thereof, that eavesdrops in on data communications taking place in a data processing environment. Process 600 may identify in step 602, for example, whether communication on a designated SSL port of a certain IP address is being requested.

Process 600 inserts a certificate use verifying proxy into the SSL channel (step 604). Insertion of a proxy server, including a certificate use verifying proxy, may be accomplished, for example, by modifying the domain name service entries in a data processing environment such that communication directed to a particular IP address or a particular port is redirected to the proxy server.

Process 600 presents the inserted proxy's certificate on the SSL channel (step 606). Process 600 may receive a client response to step 606. Process 600 determines if a client using the SSL channel responded normally to the SSL communication, such as by sending a session key (step 608). A client responds normally when the client responds as expected in a successful progression of the SSL communication.

If process 600 determines that the client responded normally ("Yes" path of step 608), process 600 determines the client may not be validating the server's identity, thus, verifying an improper use of the certificate by the client (step 610). Process 600 may log the determination of step 610, or notify a user about the potential for SSL masquerading vulnerability in interacting with that client (step 612).

If process 600 determines that the client did not respond normally, such as when the client returns an error to the proxy, or terminates communication on the SSL channel, ("No" path of step 608), process 600 determines that the client may be validating the server's identity from the certificate (step 614). Thus, process 600 may verify a proper use of the certificate by the client. Additionally, upon verifying the proper use of the certificate by the client, an embodiment may present a second certificate to the client, the second certificate identifying a party to the secure data communication as intended by the client.

Figure 7A:
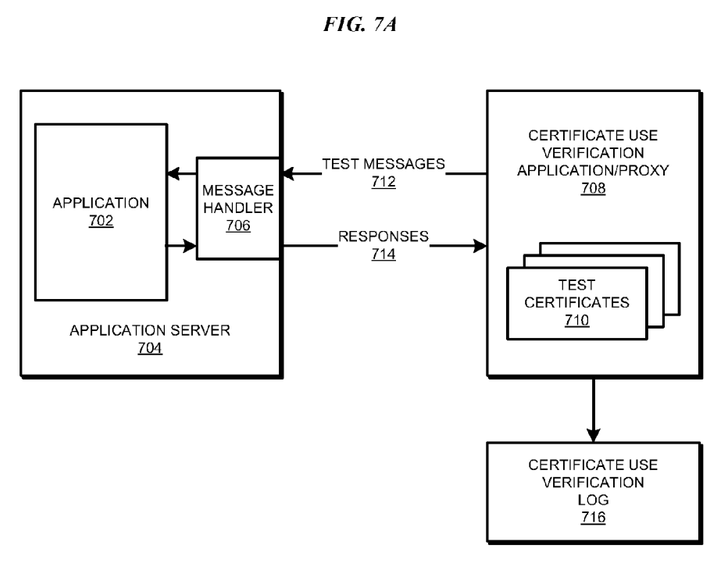
FIG. 7A depicts a block diagram of an exemplary configuration for certificate use verification in accordance with an illustrative embodiment.

With reference to FIG. 7A, this figure depicts a block diagram of an exemplary configuration for certificate use verification in accordance with an illustrative embodiment. Application 702 may be an application whose certificate use is to be verified by the illustrative embodiment. Application 702 may be analogous to client 502 in FIG. 5. Application 702 may further be an application executing under application server 704, which may implemented using application server 103 in FIG. 1. Message handler 706 may be a component in application server 704 for handling data communication involving application server 704, including SSL communication for application 702.

Certificate use verification application 708 may be an application implementing the certificate use verification function as described above. Alternatively, certificate use validation application 708 may be the certificate use verification function included in a proxy, such as proxy 512 in FIG. 5. Certificate use verification application 708 may use a set of test certificates, test certificates 710, for performing the certificate use verification function. A set of test certificates is one or more test certificates.

Certificate use verification application 708 may send one or more test messages 712 to application 702 with different certificates selected from test certificates 710. In response to the test messages 712, certificate use verification application 708 may receive zero or more responses 714. Depending on a particular response in responses 714 and the corresponding test message in test messages 712, certificate use verification application 708 may determine whether application 702 is using the certificate to verify the identity of certificate use verification application 708. Certificate use verification application 708 may make this determination by using a process similar to process 600 in FIG. 6. Certificate use verification application 708 may log these determinations in certificate use verification log 716. Certificate use verification log 716 may be a flat file, an index file, a relational database, an object oriented database, or a data repository of any other suitable kind.

Figure 7B:
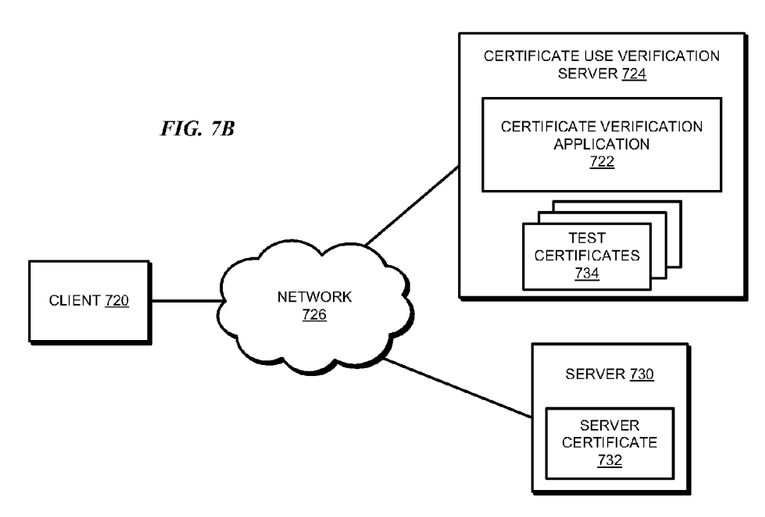
FIG. 7B depicts a block diagram of another exemplary configuration for certificate use verification in accordance with an illustrative embodiment.

With reference to FIG. 7B, this figure depicts a block diagram of another exemplary configuration for certificate use verification in accordance with an illustrative embodiment. Client 720 may be an application whose certificate use is to be verified by the illustrative embodiment. Client 720 may be analogous to client 502 in FIG. 5, or application 702 in FIG. 7A.

Certificate use verification application 722 may be executing on certificate use verification server 724, which may be accessed over network 726. For example, certification use verification server 724 may be a server hosted by a data security organization that may offer a service to users for testing if their applications pose an SSL masquerading vulnerability. In this manner, the data security company may act as a security clearing house, or security certification authority, for providing additional assurances of the security of client 720 and other SSL enabled applications.

Server 730 may be a server data processing system or a server application, such as server 504 in FIG. 5, that may be reachable on network 726. Client 720 may establish SSL communication, such as for exchanging business transactions, with server 730. Server 730 may use server certificate 732 for such SSL communication.

Certificate use verification application 722 may use a set of test certificates, test certificates 734, for performing the certificate use verification function. Certificate use verification application 722 may operate in the manner described with respect to FIG. 7A for users of client 720 to test the vulnerabilities of client 720. Certificate use verification application 722 may determine whether client 720 is using the certificates to verify the identity of certificate use verification application 722. Certificate use verification application 708 may make this determination by using a process similar to process 600 in FIG. 6. Certificate use verification application 722 may notify the users of client 720 of these determinations, such as by email, webpage, or other suitable methods of notification.

Figure 7C:
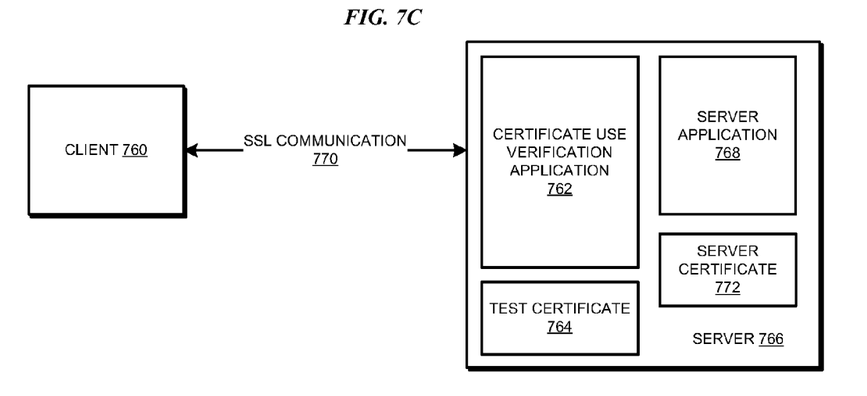
FIG. 7C depicts a block diagram of another exemplary configuration for certificate use verification in accordance with an illustrative embodiment.

With reference to FIG. 7C, this figure depicts a block diagram of another exemplary configuration for certificate use verification in accordance with an illustrative embodiment. Client 760 may be an application whose certificate use is to be verified by the illustrative embodiment. Client 760 may be analogous to client 502 in FIG. 5.

Certificate use verification application 762 may be an application implementing the certificate use verification function as described above. Alternatively, certificate use validation application 762 may be the certificate use verification function included in a proxy, such as proxy 512 in FIG. 5. Certificate use verification application 762 may use test certificate 764, for performing the certificate use verification function.

In one embodiment, as in FIG. 7C, certificate use verification application 762 execute on server 766, together with server application 768. Client 760 may wish to establish SSL communication 770 with server application 768. Server application 768 may use server certificate 772 for SSL communication 770.

Certificate use verification application 762 may detect SSL communication 770 over an SSL channel in server 766. Certificate use verification application 762 inserts itself in the SSL channel so that SSL communication 770 with server application 768 is redirected to certificate use verification application 762. Certificate use verification application 762 may send a message to client 760 with test certificate 764 instead of server certificate 772. In response, certificate use verification application 762 may or may not receive a response. Depending on a particular response, such as an error, or no response, such as terminated SSL communication, certificate use verification application 762 may determine whether client 760 is using the certificate to verify the identity of server application 768. Certificate use verification application 762 may make this determination by using a process similar to process 600 in FIG. 6. Certificate use verification application 762 may log these determinations as in FIG. 7A.

The components in the block diagrams and the steps in the flowcharts described above are described only as exemplary. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for verifying certificate use. By implementing the illustrative embodiments, a user may be able to verify if an application is using the certificates for identifying the holder of the certificate. The user may thus be able to determine if an application in the user's data processing environment is causing a potential SSL vulnerability and compromising security of secured data communications. Users may then be able to take actions to remedy the vulnerability.

Where remedying the vulnerability by modifying the client application is not a viable option, a user may be able to configure the certificate use verification proxy to intercept all messages to and from the client application and handle the certificate processing. For example, the certificate use verification proxy can examine the certificate from a message without damaging the message and perform its own validation processing. If the certificate passes the proxy based certification validation checks, the proxy can forward the message to the client application for normal processing. If the certificate does not pass the proxy based checks, then proxy can be configured for a variety of responses, such as returning an error, logging, or refusing a data connection.

The vulnerability described above with respect to the use of certificates has been described for SSL data communications in the transport layer only as exemplary. Similar vulnerabilities can exist in other types of communications and other communication protocols where certificates are used. For example, the illustrative embodiments are similarly applicable to security in the message layer, such as in simple object access protocol (SOAP) or extensible markup language (XML) type messages as well as custom message formats where certificates may be carried with a message.

Figure 7D:
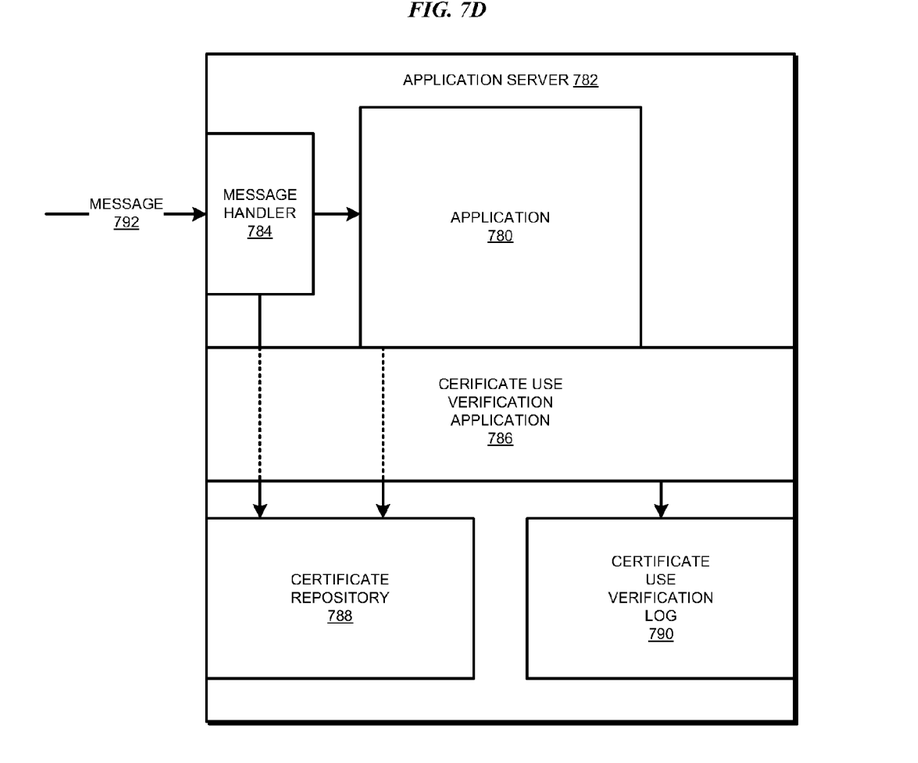
FIG. 7D depicts a block diagram of another example configuration for certificate use verification in accordance with an illustrative embodiment.

The illustrative embodiments are also similarly applicable configurations where a certificate is not carried with a message, only a signature is carried with the message and the certificate is stored locally. FIG. 7D depicts a block diagram of another example configuration for certificate use verification in accordance with an illustrative embodiment. In such cases certificate use validation proxy 786 may validate a certificate when application 780 or associated message handler 784, executing in application server 782 and receiving message 792, performs a key retrieval from certificate storage 788. The proxy can extract the certificate associate with the requested key and validate the certificate using proxy based validation. In this manner, the illustrative embodiments may, using certificate use verification log 790, report on certificates in a certificate storage, such as a local key store, and optionally provide some notification to a user if a certificate is about to expire within a preset threshold period.

The illustrative embodiments may also notify the user or take other implementation specific actions for certificates that may have been revoked by the issuing certificate authority. As a further enhancement, the illustrative embodiments may provide that the certificate use verification proxy occasionally or periodically scan the certificate storage and check the certificates stored therein for expired or revoked certificates and provide logging/messages to the user warning about any existing or future issues relating to certificates in the certificate storage.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for verifying certificate use, the method comprising:
    transmitting by a certificate use verification application executing in conjunction with a proxy server, to a certificate using application, a message including a test certificate during a secure data communication, the test certificate being invalid with respect to a characteristic of the secure data communication;
    determining whether the certificate using application responds to continue the secure data communication by exchanging a session key for the secure data communication instead of an error after processing the message including the test certificate;
    establishing, responsive to the certificate using application responding to continue the secure data communication, that the certificate using application does not perform correct certificate use in a secure data communication;
    intercepting, by the certificate use verification application, a second message directed to the certificate using application; and
    performing, by the certificate use verification application, correct processing of a certificate associated with the second message.

2. The method of claim 1, further comprising:
    forwarding, responsive to the certificate associated with the second message passing a certificate validation check, the second message to the certificate using application.

3. The method of claim 1, further comprising:
    detecting the secure data communication from the certificate using application to a second data processing system; and
    redirecting the secure data communication from the second data processing system to the certificate use verification application.

4. The method of claim 1, further comprising:
    presenting from the certificate use verification application a second certificate to the certificate using application, the second certificate identifying a party to the secure data communication as intended by the certificate using application.

5. The method of claim 1, wherein the characteristic of the secure data communication is an identity of an assignee of a certificate, wherein to perform the correct certificate use comprises:
    determining whether an entity identified in the test certificate matches an identity of a party to the secure data communication as intended by the certificate using application, wherein the test certificate is invalid because the entity identified in the test certificate is different from the party to the secure data communication.

6. A computer usable program product comprising a computer usable storage device including computer usable code for verifying certificate use, the computer usable code comprising:
    computer usable code responsive to executing using a processor causing transmitting by a certificate use verification application executing in conjunction with a proxy server, to a certificate using application, a message including a test certificate during a secure data communication, the test certificate being invalid with respect to a characteristic of the secure data communication;
    computer usable code responsive to executing using the processor causing determining whether the certificate using application responds to continue the secure data communication by exchanging a session key for the secure data communication instead of an error after processing the message including the test certificate;
    computer usable code responsive to executing using the processor causing establishing, responsive to the certificate using application responding to continue the secure data communication, that the certificate using application does not perform correct certificate use in a secure data communication;
    computer usable code responsive to executing using the processor causing intercepting, by the certificate use verification application, a second message directed to the certificate using application; and
    computer usable code responsive to executing using the processor causing performing, by the certificate use verification application, correct processing of a certificate associated with the second message.

7. The computer usable program product of claim 6, further comprising:
    computer usable code responsive to executing using the processor causing forwarding, responsive to the certificate associated with the second message passing a certificate validation check, the second message to the certificate using application.

8. The computer usable program product of claim 6, further comprising:
    computer usable code responsive to executing using the processor causing detecting the secure data communication from the certificate using application to a second data processing system; and
    computer usable code responsive to executing using the processor causing redirecting the secure data communication from the second data processing system to the certificate use verification application.

9. The computer usable program product of claim 6, further comprising:
    computer usable code responsive to executing using the processor causing presenting from the certificate use verification application a second certificate to the certificate using application, responsive to the certificate using application responding not to continue the secure data communication, the second certificate identifying a party to the secure data communication as intended by the certificate using application.

10. The computer usable program product of claim 6, wherein the characteristic of the secure data communication is an identity of an assignee of a certificate, wherein to perform the correct certificate use comprises:
   determining whether an entity identified in the test certificate matches an identity of a party to the secure data communication as intended by the certificate using application, wherein the test certificate is invalid because the entity identified in the test certificate is different from the party to the secure data communication.

11. A data processing system for verifying certificate use, the data processing system comprising:
   a storage device, wherein the storage device stores computer usable program code; and
   a processor, wherein the processor executes the computer usable program code, and wherein the computer usable program code comprises:
      computer usable code responsive to executing using the processor causing transmitting by a certificate use verification application executing in conjunction with a proxy server, to a certificate using application, a message including a test certificate during a secure data communication, the test certificate being invalid with respect to a characteristic of the secure data communication;
      computer usable code responsive to executing using the processor causing determining whether the certificate using application responds to continue the secure data communication by exchanging a session key for the secure data communication instead of an error after processing the message including the test certificate;
      computer usable code responsive to executing using the processor causing establishing, responsive to the certificate using application responding to continue the secure data communication, that the certificate using application does not perform correct certificate use in a secure data communication;
   computer usable code responsive to executing using the processor causing intercepting, by the certificate use verification application, a second message directed to the certificate using application; and
   computer usable code responsive to executing using the processor causing performing, by the certificate use verification application, correct processing of a certificate associated with the second message.

12. The data processing system of claim 11, further comprising:
   computer usable code responsive to executing using the processor causing forwarding, responsive to the certificate associated with the second message passing a certificate validation check, the second message to the certificate using application.

13. The data processing system of claim 11, further comprising:
   computer usable code responsive to executing using the processor causing detecting the secure data communication from the certificate using application to a second data processing system; and
   computer usable code responsive to executing using the processor causing redirecting the secure data communication from the second data processing system to the certificate use verification application.

14. The data processing system of claim 11, further comprising:
   computer usable code responsive to executing using the processor causing presenting from the certificate use verification application a second certificate to the certificate using application, the second certificate identifying a party to the secure data communication as intended by the certificate using application.

15. The data processing system of claim 11, wherein the characteristic of the secure data communication is an identity of an assignee of a certificate, wherein to perform the correct certificate use comprises:
   determining whether an entity identified in the test certificate matches an identity of a party to the secure data communication as intended by the certificate using application, wherein the test certificate is invalid because the entity identified in the test certificate is different from the party to the secure data communication.

16. A system for verifying certificate use, the system comprising:
   a data processing system having a processor and a storage device including a certificate use verification application;
   a certificate using application requesting a secure data communication with an intended party;
   a test certificate configured to include an identity of an assignee of the test certificate, the assignee being different from the intended party; and
   the certificate use verification application executing in conjunction with a proxy server, transmitting to the certificate using application, a message including the test certificate during the secure data communication, the test certificate being invalid with respect to a characteristic of the secure data communication,
   the certificate use verification application determining whether the certificate using application responds to continue the secure data communication by exchanging a session key for the secure data communication instead of an error after processing the message including the test certificate,
   the certificate use verification application establishing, responsive to the certificate using application responding to continue the secure data communication, that the certificate using application does not perform correct certificate use in a secure data communication;
   intercepting, by the certificate use verification application, a second message directed to the certificate using application; and
   performing, by the certificate use verification application, correct processing of a certificate associated with the second message.

17. The system of claim 16, further comprising:
   forwarding, responsive to the certificate associated with the second message passing a certificate validation check, the second message to the certificate using application.

18. The system of claim 16, further comprising:
   the certificate use verification application detecting the secure data communication from the certificate using application to a server, and
   the certificate use verification application redirecting the secure data communication from the server to the certificate use verification application.

19. The system of claim 16, further comprising:
   the certificate use verification application presenting a second certificate to the certificate using application, the second certificate being configured to identify the intended party.

20. The system of claim 16, wherein the characteristic of the secure data communication is an identity of an assignee of a certificate, wherein to perform the correct certificate use comprises:

determining whether the assignee identified in the test certificate matches an identity of the intended party, wherein the test certificate is invalid because the assignee identified in the test certificate is different from the intended party.

21. A system for verifying certificate use, the system comprising:

means for transmitting by a certificate use verification application executing in conjunction with a proxy server, to a certificate using application, a message including a test certificate during a secure data communication, the test certificate being invalid with respect to a characteristic of the secure data communication;

means for determining whether the certificate using application responds to continue the secure data communication by exchanging a session key for the secure data communication instead of an error after processing the message including the test certificate;

means for establishing, responsive to the certificate using application responding to continue the secure data communication, that the certificate using application does not perform correct certificate use in a secure data communication;

means for intercepting, by the certificate use verification application, a second message directed to the certificate using application; and     means for performing, by the certificate use verification application, correct processing of a certificate associated with the second message.

* * * * *